United States Patent Office 3,551,200
Patented Dec. 29, 1970

3,551,200
ELECTRICAL COMPONENT INSULATED BY POLY(1,12 DODECAMETHYLENE PYROMELLITIMIDE) OR POLY(1,13 TRIDECAMETHYLENE PYROMELLITIMIDE)
Edward C. Stivers, Atherton, Calif., assignor to Raychem Corporation, Menlo Park, Calif., a corporation of California
No Drawing. Filed Sept 18, 1968, Ser. No. 760,659
Int. Cl. C08g 20/32
U.S. Cl. 117—232                                                10 Claims

ABSTRACT OF THE DISCLOSURE

Thermoplastic polyimides derived from straight chain alkylene diamines and pyromellitic anhydride are prepared and fabricated into useful articles, e.g., wire insulation. The polyimides can be crosslinked to improve their high temperature properties.

BACKGROUND OF THE INVENTION

The present invention relates to polyimides and a process for their manufacture. The invention also relates to articles made from the polyimides.

In British patent specification No. 570,858 there is disclosed a process for the manufacture of fiber-forming polyimides, in which the reaction of polycarboxylic acids, in particular tricarboxylic and tetracarboxylic acids or their derivatives, with diamines or their derivatives was employed. In that specification, it was also disclosed that the polymer could be rendered viscosity-stable by using a small excess of one reactant or the other (up to 5%) or by the addition to the reaction mixture of monoamines or monocarboxylic acids, or derivatives thereof, a process now generally known as capping.

In United States Pat. No. 2,710,853 to Edwards et al., it was pointed out that although the products of the British patent and other previous proposals were fiber-forming none of these products was suitable for injection molding, and Table III of that patent illustrates the unsuitability of a large number of polypyromellitimides for this purpose, the individual polymers failing for one or more of a number of different reasons. The inherent unpredictability of the properties of such polymers is well brought out in that patent, which discloses that the polypyromellitimides derived from 1,9-nonanediamine,4,4-dimethyl-1,7-heptanediamine, and 3-methyl-1,7-heptanediamine had unexpectedly superior properties which fitted them for injection molding whereas apparently similar polymers derived from, inter alia, the homologous aliphatic diamines, 1,8-octanediamine, 2,11-dodecanediamine and 1,12-octadecanediamine were unsuitable for this purpose. Briefly, the polymer derived from 1,8-octanediamine failed to give a film which is flexible after heating, and the polymers derived from the other two long-chain diamines have a low glassy state transition temperature. Thus, in general, the polypyromellitimides derived from the longer chain aliphatic diamines would appear to have low transition temperatures and, as such, to be completely unsuited for any application in which good properties at elevated temperatures are necessary. This observation would be in accordance with the view of such polymers as ethylene polymers interrupted at intervals by another group—the longer the aliphatic diamine chain, the nearer the material approaches the properties of polyethylene with its known disadvantage of poor high temperature properties.

Because of the poor high-temperature properties of the polyimides derived from the longer-chain aliphatic diamines, such as those described in U.S. Pat. 2,710,853, the polyimides derived from aromatic diamines have been substantially exclusively used commercially whenever good high-temperature properties have been necessary. Polyimides derived from aromatic diamines and anhydrides are, however, intractable and it is necessary to carry out all processing on the polyamic acid intermediate, the polyimide being formed by curing of the polyamic acid after the necessary shaping, coating, etc., has been completed. This greatly restricts the use of such materials since it is not practical to cure a solid structure of the polyamic acid, but only comparatively thin layers, or articles with very low wall thickness.

Thus, there remained a need for a melt-processable polyimide which will have useful properties at elevated temperatures, and which can be extruded into such structures as, for example, tubing, cable insulation, and in general, a structure having substantial wall thickness.

SUMMARY OF THE INVENTION

The present invention provides polyimides derived from long-chain aliphatic diamines and pyromellitic anhydride, the polyimide being thermoplastically processable and capable of forming structures which can have substantial wall thickness and at the same time having good high-temperature properties. The polyimides having this combination of properties are those derived from 1,12-dodecanediamine and 1,13-tridecanediamine and pyromellitic anhydride.

The polymers can be made by reaction of the anhydride, or a derivative thereof, with the diamine, either in the melt or preferably in solution. The solution reaction may be carried out in any solvent for one of the reactants which is inert to the reactants and the polymer under the reaction conditions; preferably, the solvent is one in which the polymer is insoluble. As examples of suitable solvents there may be mentioned N,N-dimethylacetamide, N,N-dimethylformamide, N-methyl-2-pyrrolidone, dimethylsulfoxide, and mixtures thereof. The quantity of solvent is not critical, but should preferably be enough to dissolve the whole of at least one reactant. The reaction is preferably carried out under a non-oxidizing atmosphere, for example, under nitrogen, under anhydrous conditions, initially at a temperature within the range of from about −20° C. to about 70° C., preferably from 20° C. to 40° C., and finally at about 150° C. to 250° C. (depending upon the boiling temperature of the solution).

The reaction may also be carried out in the melt using an imide-forming derivative of pyromellitic anhydride, for example, the ethyl ester.

The molecular weight of the polymer may be influenced by a number of factors, among which may be mentioned the relative proportions of the primary reactants and the presence of additional reactants, either amine or acid, which participate in the reaction both as chain terminating agents and as reactants capable of breaking an amide or imide group already formed. As examples of such materials, there may be mentioned primary aliphatic monoamines, primary aromatic amines or aromatic or aliphatic anhydrides, for example, aniline, laurylamine, succinic anhydride, and phthalic anhydride.

It has been found that when only the primary reactants are present, the molecular weight of the polymer is dependent on their relative proportions, and that a small departure from equimolar proportions has a large effect on the molecular weight. A useful polyimide is only produced when the ratio of amine to anhydride is close to these proportions. Generally, the proportions should be such as to give an inherent viscosity, measured at 70° C. in m-cresol (0.5 g./100 ml.), of at least about 0.5, preferably 0.75 to 5. References throughout this specification, including the claims, to inherent viscosities are to viscosities measured in this way. It has been found that if the diamine is present in too great an excess the polyimide will be crosslinked, and not thermoplastic, whereas if the anhydride is in great excess the polyimide will have too low a molecular weight, resulting in a polymer which is brittle. Thus, above an inherent viscosity of about 5 and below about 0.5, the polymer is non-thermoplastic and brittle, respectively. Because of the difficulty of obtaining pure reactants, and the greater difficulty of accurately analyzing the reactants, especially the anhydride, it is not possible to state precisely the permissable range of propotrions of reactants. It is believed, however, that the proportion of anhydride to diamine may deviate from equimolar by up to about 1% on the amine-rich side and up to about 10%, but preferably up to about 5%, on the anhydride-rich side of equimolarity.

When secondary reactants are present, the relative proportion of the primary reactants is still relevant, but the molecular weight of the polyimide is also influenced by the quantity and properties of the secondary reactant. Thus, for example, addition of a primary monoamine or anhydride will decrease the molecular weight of the polyimide by terminating the chain. Further, the presence of an anhydride will reduce the tendency of a diamine-rich material to form a cross-linked polyimide during manufacture, as also will the addition of an anhydride during subsequent processing, for example during drying of the polymer. The proportions of secondary reactants should not, in general, exceed 5% by weight of the primary reactants.

Advantageously, the proportions of reactants, including primary and secondary reactants, should be such that at 200° C., under non-oxidizing conditions, the inherent viscosity increases by at most 1% per minute, preferably by at most 5% per hour.

The polyimides of the present invention are crystalline thermoplastic polymers, having a crystalline melting point of about 285° C. to 290° C. (for $C_{12}$) and 263° C. to 268° C. (for $C_{13}$). They can be shaped by extrusion, molding, etc., to form sheets, films, tubing, wire insulation, etc. Structures formed from the polyimides have good elongation and impact strength, the material having good dielectric properties.

Compositions containing the polyimides of the present invention may also comprise antioxidants, flame retardants, pigments, fillers and other additives in general use, provided that such additives are themselves capable of undergoing without decomposition the high temperature processing to which the polyimides themselves can be subjected. With this limitation, any of the addtives known in the art may be used. As examples, there may be mentioned; as antioxidants, N,N'-di-β-naphthyl-p-phenylenediamine, 1,3,5 - trimethyl-2,4,6-tris(3,5-ditert-butyl-4-hydroxybenzyl)benzene, distearyl thiodipropionate, phenyl didecyl phosphite, and Irganox 1010 (pentaerythrityl 3,5-ditert-butyl-4-hydroxydihydrocinnamate).

As flame retardants there may be mentioned the bisimides formed from m- or p-phenylene diamines, m- or p-xylylidene diamines, and chlorine- or bromine-substitution products thereof with tetrabromo and tetrachlorophthalic anhydride, which form a part of the subject matter of application Ser. No. 760,664 in the name of Joseph Sonnenberg entitled "Flame Retardants," the disclosure of which is incorporated by reference herein. The polyimide compositions may also contain antimony oxide and titanium dioxide.

The good high temperature properties of articles made from the polyimides may be enhanced by radiation crosslinking of the articles despite the presence of the aromatic ring grouping which readily absorbs high energy radiation, releasing it subsequently as thermal energy. The radiation dose needed for crosslinking depends on the molecular weight of the polymer; doses from about 50 to 100 Mrad are suitable. Such irradiated, crosslinked polyimide materials have form stability above the softening point and have all the advantages of crosslinked materials in general combined with the good high temperature properties of the original polyimide.

The dose needed to crosslink a polymer of the invention to a given extent, as measured by its gel content and its Young's modulus above the crystalline melting point, can be reduced by incorporating in the composition to be irradiated a polyfunctional monomer which promotes irradiation crosslinking. As monomers suitable for use in conjunction with the polymers, there may be mentioned by way of example monomers having a plurality of ethylenically unsaturated carbon-to-carbon bonds, e.g., triallyl trimellitate, diallyl phthalate and isophthalate, triallyl cyanurate and isocyanurate, tetraallyl pyromellitate, dienes, e.g., 1,11-dodecadiene, and bis-maleimides, e.g., dodecamethylene bis-maleimide or p-phenylene bis-maleimide. The polyfunctional monomer is advantageously present in proportion up to about 10%, preferably up to 5%, based on the weight of the polyimide.

The monomers mentioned above are themselves thermally polymerizable and it is especially desirable in some cases, when a polyfunctional monomer is present, also to add a compound known to act as a free radical scavenger, to inhibit homopolymerization of the monomer. As scavengers, there may be mentioned hydroquinones, e.g., hydroquinone and hindered hydroquinones, and aromatic phenols, for example those mentioned above as phenolic antioxidants.

The present invention accordingly also provides irradiation crosslinked poly(1,12 - dodecamethylene pyromellitimide) and poly(1,13 - tridecamethylene pyromellitimide) compositions containing such materials, and articles formed of such compositions.

The present invention also provides an article made from a composition comprising crosslinked poly(1,12-dodecamethylene pyromellitimide) or poly(1,13 - tridecamethylene pyromellitimide), which article has the property of elastic memory. An article having this property is one which has been deformed from an original heat-stable dimensional form into a different, heat-unstable form. While this article is maintained below a certain temperature, it will retain its unstable form, but when it is heated to above this temperature, termed the recovery temperature, it will recover toward its original form. One method of imparting the property of elastic memory is disclosed in U.S. Pat. No. 3,086,242 to Cook et al., the disclosure of which is incorporated by reference herein. Many examples of articles having the property of elastic memory are given in U.S. Pats. Nos. 3,243,211 and 3,297,819 to Judson Douglas Wetmore and application Ser. No. 228,300 by Paul M. Cook (British Pat. No. 1,033,959) the disclosures of which are incorporated by reference herein.

The properties of the poly(dodecamethylene pyromellitimide) and poly(tridecamethylene pyromellitimide) made them and compositions containing them well suited for numerous applications. They combine high impact strength with a high elongation, and these properties, combined with good electrical and high temperature properties, especially when crosslinked, render them especially suitable for insulation for wire, cable, and other electric and electronic components.

EXAMPLE I

A one liter, three-necked flask fitted with a mechanical stirrer, thermometer and a nitrogen inlet tube was dried in an oven at 150° C. 384 g. of N-methyl-2-pyrrolidone was introduced under a nitrogen blanket. The flask was charged with 28.052 g. (0.1400 mole) of 1,12-dodecanediamine and was heated to 85° C. to dissolve the diamine. The solution was cooled with stirring to 30° C. and 30.537 g. (0.1400 mole) of pyromellitic dianhydride was added. The temperature of the solution rose to 51° C. in 5 minutes. The viscosity of the light yellow solution increased. One hour after the addition of the pyromellitic anhydride the temperature had fallen to 42° C. The flask was then immersed in an oil bath at 200° C. The temperature of the reaction mixture increased to 160° C. in 20 minutes and was maintained at that temperature for an additional hour. During this period the light yellow solution turned to a light orange color. Later it became cloudy and by the end of the heating period a thick slurry formed. The slurry was cooled to 50° C. and filtered. The fine white precipitate was suspended in 500 ml. methanol, stirred in a Waring Blender and filtered. This procedure was repeated. The fine white precipitate was dried in a vacuum oven at 100° C. until no more liquid was collected in the trap. The temperature of the oven was then increased to 200° C. and maintained for 12 hours. The inherent viscosity of the fine yellowish powder was 1.75. Yield: 97%. A slab 0.015 inch thick was molded at 300° C. The slab was smooth, uniform, bubble-free, and of a translucent light tan color. The properties are summarized as follows:

| | |
|---|---|
| Density (g./cm.$^3$) | 1.22 |
| Tensile strength (p.s.i. at room temperature) | [1] 7,700 |
| Elongation at break (percent) | [1] 260 |
| Crystallinity (percent) | 39±6% |
| Crystalline melting point (° C.) | 286±1° C. |
| Dielectric constant: | |
| 100 Hz | 2.70 |
| 1 kHz | 2.69 |
| 10 kHz | 2.69 |
| 100 kHz | 2.68 |
| 1 MHz | 2.69 |
| Dissipation factor: | |
| 100 Hz | .0006 |
| 1 kHz | .00059 |
| 10 kHz | .00067 |
| 100 kHz | .00126 |
| 1 MHz | .00286 |
| Volume resistivity (ohm cm.) | 2.8×10$^{16}$ |

[1] 200%/minute.

EXAMPLE II

In the apparatus described in Example I, 30.010 g. of 1,13-tridecanediamine (0.140 mole) was dissolved in 384 g. of N-methyl-2-pyrrolidone by heating to 85° C. The solution was cooled to 30° C. while stirring, and 30.538 g. of pyromellitic anhydride (0.140 mole) added. The temperature and viscosity of the reaction mixture increased. After one hour, the flask was heated to 160° C. over the course of 20 minutes, and maintained at 160° C. for an hour, during which period a slurry formed. The slurry was treated as described in Example I, yielding poly(1,13-tridecamethylene pyromellitimide), melting point 264 to 266° C., inherent viscosity 0.85. Yield: >97%.

EXAMPLE III

The procedure of Example I was followed except that the solvent used was N,N-dimethylacetamide and that the solution of diamine was cooled to 35° C. before addition of the anhydride. The resulting polyimide had an inherent viscosity of 1.26.

EXAMPLE IV

The procedure of Example I was followed, the molar ratio of diamine to anhydride being varied. The inherent viscosity of the polyimide varied as follows:

Moles of pyromellitic anhydride
Moles of 1,12-dedecanediamine         Inherent viscosity

| | |
|---|---|
| 0.960 | Gelled |
| 0.980 | Gelled |
| 0.985 | Gelled |
| 0.9875 | Gelled |
| 0.990 | 2.58 |
| 0.9925 | 1.94 |
| 0.995 | 1.79 |
| 0.997 | 1.61 |
| 1.000 | 1.69 |
| 1.001 | 1.63 |
| 1.003 | 1.60 |
| 1.005 | 1.53 |
| 1.010 | 1.53 |
| 1.031 | 1.18 |

Because of the difficulty of obtaining pure pyromellitic anhydride and of analyzing the anhydride accurately, the molar ratios given above are not precise. The higher inherent viscosity and crosslinking (indicated by gelling) resulting from excess diamine is clearly shown. Also, it will be seen that it is a matter of simple experiment to determine the required ratio of diamine to anhydride to obtain a thermoplastic product.

EXAMPLE V 200 ml. of anhydrous methanol was placed in a 500 ml. three-necked flask fitted with a mechanical stirrer, thermometer and condenser. 26.35 g. (0.0848 mole) of diethyl pyromellitate and 16.96 g. (0.0848 mole) of 1,12-dodecanediamine were added. The solution was kept under reflux for one hour; the solvent was then evaporated and the white salt was dried in a vacuum oven at 60° C. The yield was quantitative.

30 g. of the salt of diethyl pyromellitate and 1,12-dodecanediamine were placed in a glass reactor. The reactor was evacuated to a pressure of 10 microns and flushed with $N_2$ several times. Finally a slow stream of $N_2$ was passed through the salt at atmospheric pressure. The reactor was heated to 135° C. and kept at that temperature for 2 hours, and the temperature was then increased to 325° C., during which period some ethanol and water were driven off. The solids melted and formed a very viscous light tan mass; the viscosity increasing with time. The polymer was kept at 325° C. for one hour, and then cooled to room temperature. The tan solid was dissolved in m-cresol, reprecipitated in acetone, and dried in a vacuum oven at 150° C.

| | |
|---|---|
| Inherent viscosity | 1.47. |
| Room temperature elongation | 160% (rate 2000%/minute). |
| Melting point | 287 to 289° C. (determined with polarized microscope). |

EXAMPLE VI

A glass-lined reaction vessel, fitted with a 100 r.p.m. three-bladed impeller and a single baffle, capacity 75 liters was charged with 58.2 liters of water-free N,N-dimethylacetamide, to which was added 3099 g. (15.467 moles) 1,12-dodecanediamine. The reactor was heated to 70° C. to dissolve the diamine, and then cooled to between 35° C. and 40° C. before adding 3385 g. (15,517 moles) pyromellitic anhydride. The temperature rose to about 55° C. on addition of the anhydride, and was then raised to 165° C. and maintained for 1 hour, after which period the reactor was cooled to 30° C. in the course of about 30 minutes.

The slurry in the reactor was centrifuged, washed with methanol, stirred, and recentrifuged; this process was repeated, and the resulting cake dried in a conical vacuum drier-blender, at room temperature for 2 hours, and at 160° C. for 17 hours, the pressure falling to about 0.2 mm. Hg. The resulting polyimide had an inherent viscosity of 1.70.

EXAMPLE VII

The example shows the effect on the properties of the polymer when a secondary reactant is present. The procedure followed was that of Example I, modified as indicated.

(A) 99.5 molar parts of pyromellitic anhydride and 100.5 molar parts of 1,12-dodecanediamine were reacted; after drying the polymer for 4 hours at 150° C., the inherent viscosity was too high to measure, and a gel content of 72.3% was obtained, indicating considerable crosslinking.

(B) 99.5 molar parts of pyromellitic anhydride, 100.5 molar parts of 1,12-dodecanediamine and 1 molar part of phthalic anhydride were reacted; after drying the polymer for 4 hours at 150° C., the inherent viscosity was 1.30. After further drying for 12 hours at 200° C., the inherent viscosity had risen to 1.62; a gel content of 0.23% was obtained, indicating virtually no crosslinking.

(C) 100.5 molar parts of pyromellitic anhydride and 99.5 molar parts of 1,12-dodecanediamine were reacted; after drying the polymer for 4 hours at 150° C., the inherent viscosity was 1.64.

(D) 100.5 molar parts of pyromellitic anhydride, 99.5 molar parts of 1,12-dodecanediamine and 1.0 molar part of laurylamine (1-dodecaneamine) were reacted; after drying at 150° C. for 4 hours, the inherent viscosity was 1.24; after drying at 200° C. for a further 12 hours, the inherent viscosity had risen to 1.31.

In general, it was observed that capping the polymer reduced the rate of increase of inherent viscosity during drying.

EXAMPLE VIII

Three samples of poly(1,12-dodecamethylene pyromellitimide) were pressed into slabs of 0.015 inch thickness, irradiated by high energy electrons from a General Electric 1 mev. Resonant Transformer at room temperature and within 10 minutes of irradiation were annealed for 5 minutes at 150° C. The extent of crosslinking was determined by measuring the Young's modulus at 300° C. under nitrogen and by determining the gel content. The gel content was measured by refluxing the sample for 4 hours at 200° C. in m-cresol, rinsing in acetone, and refluxing in fresh m-cresol for a further 2 hours. The three samples of polymer had inherent viscosity as follows:

| Sample | Inherent viscosity |
|---|---|
| A | 0.75 |
| B | 1.02 |
| C | 1.57 |

SAMPLE A

| Dose (Mrad) | Percent gel | Modulus (p.s.i.) |
|---|---|---|
| 0 | 0 | 0 |
| 20 | 0 | 0 |
| 40 | 0 | 0 |
| 60 | 0 | 4 |
| 80 | <5 | 5 |
| 100 | <5 | 7 |
| 150 | 25 | 25 |

SAMPLE B

| Dose (Mrad) | Percent gel | Modulus (p.s.i.) |
|---|---|---|
| 0 | 0 | 0 |
| 20 | 0 | 0 |
| 40 | 0 | 3 |
| 60 | 0 | 6 |
| 80 | 16 | 17 |
| 100 | 35 | 39 |
| 150 | 50 | 80 |

SAMPLE C

| Dose (Mrad) | Percent gel | Modulus (p.s.i.) |
|---|---|---|
| 0 | 0 | 0 |
| 20 | 0 | 17 |
| 40 | 14 | 37 |
| 60 | 37 | 55 |
| 80 | 49 | 70 |
| 100 | 58 | 90 |
| 150 | 67 | 127 |

It will be noted that significantly lower doeses of radiation are needed to crosslink Sample C than Sample A.

EXAMPLE IX

Polymer prepared by the process of Example I, having an inherent viscosity of 1.1 containing 0.5% Irganox 1010, was extruded at 350° C. to 310° C. over a 20 AWG stranded silver plated copper wire running at 120 feet per minute preheated to 120° C. to form a light yellow, translucent insulation thickness of 0.010 inch. The insulated wire had good stripping qualities and was flexible, the elongation being greater than 200% at 2000%/minute. The insulation was tested for cut-through resistance using a knife having a flat edge 0.005 inch thick, moving at 0.2 inch/minute. The results are shown below.

| Temperature (° C.) | Cut through resistance (lbs.) |
|---|---|
| 23 | 70.0 |
| 150 | 19.8 |
| 200 | 11.2 |
| 250 | 6.8 |

EXAMPLE X

Poly(1,12-dodecamethylene pyromellitimide) was prepared as described in Example I, except that N-methyl-2-pyrrolidone was used as the solvent. The inherent viscosity of the polymer was 1.96.

The polymer was extruded at 350° C. to form tubing of outside diameter 0.133 inch, wall thickness 0.025 inch. The tubing was irradiated at room temperature by high energy electrons to a dose of 75 Mrad. It was then heated to 320° C. (i.e., above its crystalline melting point), expanded to an outside diameter of 0.240 inch, and cooled to room temperature while expanded.

On subsequent reheating to 320° C., the tubing shrank back to an outside diameter of 0.155 inch.

EXAMPLE XI 2 parts of N,N'-di-β-naphthyl-p-phenylenediamine were incorporated into 100 parts of the polymer prepared in Example I by mixing pulverized diamine with the polymer powder. This blend was then extruded at 320° C. into a rod of 0.125 inch diameter in a Wayne Machine & Die ¾" extruder. The rod was then chopped into lengths of 0.25 inch to form pellets, which were then pressed at 320° C. into a slab of thickness 0.020 inch. Strips cut from these slabs were placed in a 200° C. circulating oven together with comparative strips of the same polymer without the antioxidant. The strips were periodically withdrawn, folded through 180° to crease them, and folded through 360° to crease them in the opposite direction. The time for the strips to break was measured.

| Sample | Time to break (hours at 200° C.) |
|---|---|
| Polymer only | 20 |
| Polymer+2% diamine | 105 |

EXAMPLE XII

The following composition was prepared, all ingredients having been passed through a 60 mesh screen (0.25 mm. mesh size).

| Compound | Parts by weight |
|---|---|
| Polymer (Example I) | 100 |
| Irganox 1010 | 2 |
| N,N'-(p-phenylene) - bis[3,4,5,6 - tetrachloro phthalimide] | 12 |
| Antimony oxide | 11 |

The powdered ingredients were blended and pressed into slabs 4.0" x 0.25" x 0.05" at 330° C., and tested for flammability according to the procedure specified in ASTMD 635 (with the difference that the above-specified slab dimensions were employed). The average extent of burning was 0.12 inch and average time to extinction was 10 seconds (range 6 to 17 seconds). A similar sample containing 30 parts of the bis-imide and 15 parts of antimony oxide was non-burning; a comparison sample containing no additives completely burning at a rate of 1.2 inch/minute. Thus, the polymer can be effectively flame retarded despite the high processing temperatures employed with the polymer.

EXAMPLE XIII

A preferred embodiment of the invention is a light weight insulated electrical wire having good cut-through resistance at room temperature and elevated temperature. Desirably, the insulation of a 20 AWG conductor (nominal outside diameter 0.040 inch) having an insulation wall thickness 0.010 inch has an Instron cut through resistance measured using a knife edge 0.005 inch wide moving at 0.2 inch/minute of at least 50 lb. at room temperature, 23° C., 12 lb. at 150° C., 7.5 lb. at 200° C. and, preferably, 5.0 lb. at 250° C. An insulated wire was produced by extruding poly(1,12-dodecamethylene pyromellitimide) over a 20 AWG silver coated copper stranded (19 strands of 32 AWG) conductor at 125 feet per minute preheated to 120° C. The wall thickness was 0.010 inch, giving an outside diameter of approximately 0.061 inch. The cut through resistance, tested as specified above, was as follows:

| Temperature, ° C. | Cut through (lb.) |
|---|---|
| 23 | 58 |
| 150 | 14 |
| 200 | 7.5 |
| 250 | 5.1 |

From this example, and the results of the test in Example IX, it can be seen that a wire insulation having the cut through resistance required is provided by the invention.

What is claimed is:

1. An electrical or electronic component insulated by a composition consisting essentially of a polyimide selected from the group consisting of poly(1,12-dodecamethylene pyromellitimide) and poly(1,13-tridecamethylene pyromellitimide).

2. A component as claimed in claim 1, wherein said polyimide is crosslinked.

3. An electrical or electronic component insulated by a composition consisting essentially of poly(1,13-tridecamethylene pyromellitimide).

4. An insulated electrical conductor, the insulation comprising a layer the major component of which consists essentially of poly(1,12 - dodecamethylene pyromellitimide) having an inherent viscosity within the range of from 0.5 to 5, the layer having been applied to the conductor in polyimide form.

5. An electrical conductor as claimed in claim 4, wherein said polyimide is formed by reaction of 1,12-dodecanediamine with pyromellitic anhydride.

6. An electrical conductor as claimed in claim 4, wherein said polyimide is irradiation crosslinked.

7. An insulated electrical conductor, the insulation comprising a polymer consisting essentially of units of the formula

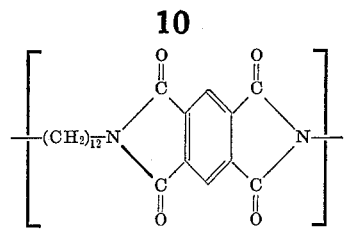

poly(1,12-dodecamethylene pyromellitimide).

8. An insulated electrical conductor, the insulation consisting essentially of an extruded layer of a polyimide having repeating units of the formula

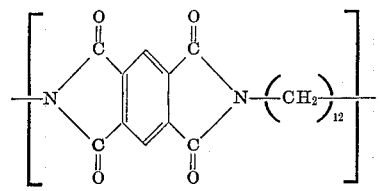

said polyimide having an inherent viscosity within the range of from 0.5 to 5.0, and having been formed by reaction of 1,12-dodecanediamine and pyromellitic anhydride.

9. An insulated electrical conductor, the insulation comprising a polyimide selected from the group consisting of poly(1,12-dodecamethylene pyromellitimide) and poly-(1,13-tridecamethylene pyromellitimide), said insulation being such that the Instron cut-through resistance to a knife edge of width 0.005 inch moving at 0.2 inch per minute of a wall thickness of 0.010 inch on a 20 AWG conductor formed of 19 strands of 32 AWG material is at least 50 lb. at 23° C., at least 12 lb. at 150° C., and at least 7.5 lb. at 200° C.

10. An insulated electrical conductor as claimed in claim 9, wherein the polyimide is poly(1,12-dodecamethylene pyromellitimide) and wherein the insulation is such that the Instron cut-through resistance is at least 5.0 lb. at 250° C.

References Cited

UNITED STATES PATENTS

| 2,880,230 | 3/1959 | Edwards et al. | 260—475 |
| 3,242,128 | 3/1966 | Chalmers | 260—32.6 |
| 3,342,768 | 9/1967 | Chalmers | 260—32.6 |

FOREIGN PATENTS

| 1,037,374 | 7/1966 | Great Britain | 260—78 |

OTHER REFERENCES

New Linear Polymers, Lee et al. 1967, pp. 209 and 252–261.

WILLIAM H. SHORT, Primary Examiner

H. SCHAIN, Assistant Examiner

U.S. Cl. X.R.

117—128.4, 161; 204—159.19; 260—37, 45.85, 45.9, 45.95, 78; 264—22, 95